US010700412B2

(12) United States Patent
Cenanovic et al.

(10) Patent No.: US 10,700,412 B2
(45) Date of Patent: Jun. 30, 2020

(54) CONVERTER DEVICE FOR ADAPTING AN ANTENNA IMPEDANCE, COMPRISING A HOUSING FOR A MOTOR VEHICLE, AND MOTOR VEHICLE WITH CONVERTER DEVICE INSTALLED THEREIN (71) Applicant: AUDI AG, Ingolstadt (DE)

(72) Inventors: Amir Cenanovic, Hepberg (DE); Lars Reichardt, Wettstetten (DE); Stefan Grassl, Hohenwart (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/500,766

(22) PCT Filed: Dec. 1, 2017

(86) PCT No.: PCT/EP2017/081089
§ 371 (c)(1),
(2) Date: Oct. 3, 2019

(87) PCT Pub. No.: WO2018/192673
PCT Pub. Date: Oct. 25, 2018

(65) Prior Publication Data
US 2020/0052375 A1 Feb. 13, 2020

(30) Foreign Application Priority Data
Apr. 20, 2017 (DE) .................. 10 2017 206 632

(51) Int. Cl.
H04B 1/38 (2015.01)
H01Q 1/22 (2006.01)
H01Q 1/32 (2006.01)
H01Q 1/50 (2006.01)
H04B 1/3822 (2015.01)

(52) U.S. Cl.
CPC ......... H01Q 1/2291 (2013.01); H01Q 1/3291 (2013.01); H01Q 1/50 (2013.01); H04B 1/3822 (2013.01)

(58) Field of Classification Search
CPC ....... H04W 88/02; H04W 4/80; H04W 84/12; H01Q 1/2283; H01Q 1/243; H01Q 1/2291; H01Q 1/3291; H01Q 1/50; H01Q 21/30
See application file for complete search history.

(56) References Cited

U.S. PATENT DOCUMENTS 7,454,178 B2   11/2008  Block et al.
7,663,502 B2 *  2/2010  Breed ................. B60N 2/853
                                                340/12.25

(Continued)

FOREIGN PATENT DOCUMENTS

DE      10321247 A1    12/2004
DE    102009014242 A1  12/2019
EP       3096401 A1    11/2016

OTHER PUBLICATIONS

International Search Report and Written Opinion of the International Searching Authority directed to related International Patent Application No. PCT/EP2017/081089, dated Feb. 13, 2018, with attached English-language translation; 17 pages.

(Continued)

Primary Examiner — Nhan T Le
(74) Attorney, Agent, or Firm — Sterne, Kessler, Goldstein & Fox P.L.L.C.

(57) ABSTRACT

The disclosure relates to a converter device which has a housing that can be installed into a motor vehicle. The converter device is designed to adapt an impedance of an external antenna which can be positioned outside of the housing to an impedance of at least one additional electric device via a conversion path such that a specified impedance is provided at an electric converter output. An antenna device which is independent of the conversion path is integrated into the housing of the converter device, said antenna device providing a Bluetooth and/or WLAN con- (Continued)

nection to a device, and at least one antenna device connection which is electrically connected to the antenna device is provided on the housing of the converter device as the electric output and/or electric input of the antenna device. The disclosure additionally relates to a motor vehicle comprising a converter device.

9 Claims, 3 Drawing Sheets

(56) References Cited

U.S. PATENT DOCUMENTS

| | | | |
|---|---|---|---|
| 8,035,508 B2 * | 10/2011 | Breed | B60N 2/853 |
| | | | 340/539.11 |
| 8,098,205 B2 * | 1/2012 | Rabinovich | H01Q 1/3275 |
| | | | 343/700 MS |
| 8,554,154 B1 | 10/2013 | Everson et al. | |
| 2014/0191911 A1 * | 7/2014 | Merrick | H01Q 1/38 |
| | | | 343/712 |
| 2017/0054204 A1 | 2/2017 | Changalvala et al. | |
| 2018/0151949 A1 * | 5/2018 | Lin | H01Q 7/00 |

OTHER PUBLICATIONS

International Preliminary Report on Patentability directed to related International Patent Application No. PCT/EP2017/081089, dated Jul. 19, 2019, with attached English-language translation; 11 pages.

* cited by examiner

CONVERTER DEVICE FOR ADAPTING AN ANTENNA IMPEDANCE, COMPRISING A HOUSING FOR A MOTOR VEHICLE, AND MOTOR VEHICLE WITH CONVERTER DEVICE INSTALLED THEREIN

TECHNICAL FIELD

The application relates to a converter device for adapting an impedance and/or a signal level of at least one antenna of a motor vehicle, the antenna of the motor vehicle being configured to receive a radio and/or broadcasting signal, and to a motor vehicle comprising a built-in converter device.

BACKGROUND

DE 10 2009 014 242 A1 discloses a film antenna in portable electronic devices. The at least one antenna designed in a planar manner and comprising a carrier is integrated in a housing, an impedance converter being arranged on the carrier or in the immediate vicinity thereof and is contacted by the antenna by an electrical connection. The impedance converter is configured to convert an electrical impedance of the integrated antenna.

DE 103 21 247 A1 discloses a low-loss transmission module. The transmission module comprises a power amplifier arranged on the input side, a low-pass filter arranged on the output side, and an impedance converter arranged therebetween. The integration of said components results in impedance matching between the low-impedance amplifier output and the output of the transmitter module with a predetermined output impedance, it being possible to carry out the impedance matching in stages. A disadvantage of the transmission module is that an antenna is not integrated.

EP 3 096 401 A1 discloses an antenna structure which has a dielectric surface and has an emission element on either side of the electrical surface. The two emission elements are galvanically interconnected by means of through-plated holes. A planar impedance converter is mounted on one side of the surface. Here, the impedance converter is mounted close to the at least one emission element. It is also possible for one of the emission elements itself to be designed as an impedance converter. The impedance converter is thus provided for the impedance conversion of at least one associated emission element.

A disadvantage of these known embodiments is that either an antenna is not integrated in the same housing of the impedance converter and thus a large amount of installation space is required or the impedance converter is designed solely for impedance conversion of a particular antenna integrated in the housing.

DETAILED DESCRIPTION

The application relates to a converter device for adapting an impedance and/or a signal level of at least one antenna of a motor vehicle, the antenna of the motor vehicle being configured to receive a radio and/or broadcasting signal, and to a motor vehicle comprising a built-in converter device.

DE 10 2009 014 242 A1 discloses a film antenna in portable electronic devices. The at least one antenna designed in a planar manner and comprising a carrier is integrated in a housing, an impedance converter being arranged on the carrier or in the immediate vicinity thereof and is contacted by the antenna by an electrical connection. The impedance converter is configured to convert an electrical impedance of the integrated antenna.

DE 103 21 247 A1 discloses a low-loss transmission module. The transmission module comprises a power amplifier arranged on the input side, a low-pass filter arranged on the output side, and an impedance converter arranged therebetween. The integration of said components results in impedance matching between the low-impedance amplifier output and the output of the transmitter module with a predetermined output impedance, it being possible to carry out the impedance matching in stages. A disadvantage of the transmission module is that an antenna is not integrated.

EP 3 096 401 A1 discloses an antenna structure which has a dielectric surface and has an emission element on either side of the electrical surface. The two emission elements are galvanically interconnected by means of through-plated holes. A planar impedance converter is mounted on one side of the surface. Here, the impedance converter is mounted close to the at least one emission element. It is also possible for one of the emission elements itself to be designed as an impedance converter. The impedance converter is thus provided for the impedance conversion of at least one associated emission element.

A disadvantage of these known embodiments is that either an antenna is not integrated in the same housing of the impedance converter and thus a large amount of installation space is required or the impedance converter is designed solely for impedance conversion of a particular antenna integrated in the housing.

The problem addressed according to the application is to provide a compact and cost-effective integrated solution for a converter device that includes the function of an impedance converter and/or an amplifier, and at least one antenna, without losing any flexibility in terms of antenna selection.

The problem according to the application is solved in accordance with the independent claims. Advantageous developments are described in the dependent claims, the following description and the drawings.

As a solution, the application provides a converter device mounted in a housing which can be installed in a motor vehicle. The converter device provides a function of an impedance converter and/or an amplifier, and is therefore configured to adapt or convert an impedance, and/or to convert a voltage, i.e. to carry out voltage amplification. The converter device provides at least one electrical input and at least one electrical output on the housing. An electrical input and an electrical output are each interconnected via at least one conversion path within the housing. The conversion path represents the technical functionality of the converter device. Beyond the function of converting an impedance, the conversion path may also include an amplifier or solely an amplifier that amplifies the signal. This means that, over the conversion path, which can thus also represent an amplifier path but for the sake of simplicity is always referred to in the following as a conversion path, signal amplification takes place and/or an impedance of a housing-external antenna, which can be connected to the electrical input, is converted such that a predetermined impedance is provided at the corresponding electrical output, which is referred to in the following as the converter output. The predetermined impedance is in particular in a range of from 20 ohms to 120 ohms. For example, a predetermined impedance may be 50 ohms if a power cable having an impedance of 50 ohms is intended to be connected to the electrical output. The converter device thus results in amplification and/or impedance matching between the connected antenna and the connected power cable. The converter device may also be designed such that an impedance of a connected antenna is already adapted in the conversion path to an existing electronic device within the conversion path. This means that different predetermined impedances can also be provided in the conversion path of the converter device. An antenna which is designed to receive electromagnetic waves can be connected to the electrical input of the converter device. In particular, this antenna is a broadcast antenna designed for the AM and/or FM and/or TV and/or DAB broadcast services.

A radio signal or television signal can thus be received via the antenna. The antenna is preferably designed as an electrically conductive structure on a vehicle window of the motor vehicle.

The application provides that an antenna device is additionally integrated in the housing of the converter device. This antenna device is independent of the conversion path. This means that the function of the converter device leaves the integrated antenna device unaffected. An impedance of an external antenna is thus adapted by the converter device and the broadcast signal is amplified, but not an impedance of the integrated antenna device. The antenna device is positioned at a location within the housing that is not occupied by original components of the converter device. In this case, the antenna device provides at least some components for a radio link, e.g. a connect service, via which the motor vehicle can establish a radio link with the built-in converter device. A connect service is e.g. a Bluetooth and/or Bluetooth Low Energy and/or WLAN connection. This means that the components in the antenna device at least contribute to establishing a radio link for data transmission over a short distance in accordance with a standard in the IEEE 802.15 family (e.g. Bluetooth/Bluetooth Low Energy 802.15.1) and/or to establishing a radio link for data transmission according to a standard in the IEEE 802.11 family (e.g. WLANac-802.1 lac, WLANn-802.1 in). In such a case, the antenna device may for example consist of a simple antenna with an antenna terminal. However, the antenna device may also provide the entire above-mentioned Bluetooth and/or WLAN connection, for example if the antenna device has, in addition to an antenna, additional active electronic components of at least one Bluetooth and/or WLAN module. By means of the antenna device integrated in the housing of the converter device, a connection to at least one Bluetooth and/or WLAN-capable device can therefore be provided if such a device is within an anticipated range of the antenna device. The antenna device is electrically connected to at least one output of the converter device, said output enabling the connection of an electrical cable and/or an electrical lead to the antenna device from outside the housing. By means of a connected cable, a signal received from the antenna device can be forwarded, or a signal to be transmitted from the antenna device can be supplied. The output electrically connected to the antenna device is referred to as an antenna device terminal.

The application provides the advantage that, in addition to the function of impedance matching and/or signal amplification, a separate Bluetooth and/or WLAN function is provided in the converter device. This saves space, since no additional housing, which would have to be installed in the vehicle, is needed for a Bluetooth and/or WLAN function. There are also cost savings, since an additional housing does not have to be manufactured and, during installation in a motor vehicle, just one single housing needs to be installed and connected. The application thus contributes to making assembly of a motor vehicle more rapid and cost-effective. For this purpose, the antenna device is for example mounted in a position on a circuit board that is unused by the converter device in or on the housing of the converter device or is mounted on an additional circuit board in the housing of the converter device.

In a development of the converter device, it is provided that at least one converter output and at least one antenna device terminal are configured in a common plug connection element. In other words, an electrical signal of the converter device and an electrical signal of the antenna device are provided together on a plug connection element of the converter device. A plug connection element may comprise an electrically conductive pin to which an electrical cable can be connected. By means of this one electrical pin, both the conversion path and the antenna device can be electrically connected. The connection being made by a single plug connection element has the advantage that the housing can be made more compact. There is thus the advantage of saving more space. In particular, a plurality of antenna devices and/or a plurality of conversion paths can also be electrically connected to a single plug connection element. Additionally or alternatively, it is equally possible for additional plug connection elements to be provided by the converter device, which serve as terminals. It is thus possible for each antenna device and/or each conversion path to be connected to a separate plug connection element. Likewise, a plurality of antenna devices and/or conversion paths may each be connected to a plug connection element in a grouped manner. The advantage here is that different electrical signals are available at each output of the housing of the converter device, in particular each output provides only one signal for a single broadcast service. Therefore, it is not necessary to separate a plurality of signals that are routed on a shared line again in a downstream electronic device, for example by means of frequency filters.

A development of the application provides that the at least one converter output and the at least one antenna device terminal of the converter device are designed as coaxial connection elements. This means that at least one coaxial cable can be connected to the housing of the converter device, via which a signal of the antenna device and/or the conversion path, i.e. the external broadcast antenna, is available. There may also be a plurality of coaxial connection elements on the converter device, for example if signals from the antenna device and/or the conversion path are provided in separate terminals. The at least one coaxial connection element has a securing element. This securing element is designed to mechanically secure a connection element that can be connected. This ensures that, in particular, a connected cable cannot loosen or become detached from the converter device, for example in the event of vibrations and/or impacts. If a plurality of coaxial connectors and/or coaxial sockets are mounted on the housing, individual cables and/or a shared composite cable can be connected thereto. The advantage of a shared composite cable is that individual cables are prevented from being wrongly connected, and that a single fuse element on a shared plug connection element is sufficient to ensure mechanical safety. For individual cables, one fuse element is provided per cable or per plug connection element. A securing element is, for example, a snap-fit element that mechanically interconnects two associated plug connection elements by means of a clip mechanism.

A development of the converter device according to the application provides that a component of the antenna device is an electrically conductive structure. An antenna is formed by this electrically conductive structure. In this case, this antenna may be planar, for example a patch antenna or a monopole, which means that it is designed to be flat in shape or is designed as a flat surface, a plate or a layer. This embodiment provides the advantage that such an antenna can be positioned on an existing carrier substrate of the converter device. In particular, a planar antenna requires little installation space, and therefore it can be installed in an existing housing of a converter device. This means that, in particular, no changes need to be made to the size of a housing of a converter device. Such an antenna may also be, for example, a patch antenna or a Planar Inverted-F antenna, or PIFA antenna for short. The PIFA antenna can be designed as a cost-effective bent sheet-metal part. This embodiment provides the advantage that such an antenna only requires connection points for the high-frequency signal and the ground on an existing carrier substrate of the converter device. Thus, surface area on the circuit board of the converter device can be saved. Such an antenna may also be a resonant structure on the housing of the converter device itself, which is excited to resonate via suitable coupling. A part of the housing may also be provided as a resonant structure.

A development of the application provides that the converter device has at least one preamplifier and/or transceiver, which are each part of a component of the antenna device. In this case, the preamplifier and/or transceiver is located between an antenna of the antenna device and the antenna device terminal. The preamplifier and/or transceiver are each integrated in the housing of the converter device, as well as all the components of the antenna device. In this case, a transceiver is a component which can both receive and transmit an electrical radio signal via the antenna of the antenna device as well as convert said radio signal into digital signals, for example. The advantage of this development is that, in particular, a weak signal received by the antenna of the antenna device can be preamplified by a preamplifier integrated in the transceiver and/or a separate preamplifier before further transmission losses further impair a signal strength of the weak received signal. As a result, the antenna device is suitable for receiving even weak radio signals. The advantage of this development is that a signal emitted by the antenna of the antenna device can be preamplified, in particular by a preamplifier, and the data transmission quality can be improved and/or the range of the local radio network can be increased. The voltage and/or power for the active electronic components can be supplied for example via the coaxial conductor terminals of the converter device. For the digitally converted signal from the transceiver, an interface may be provided on the converter device. The integration of further components of the antenna device in the housing of the converter device also in turn saves space and reduces cost, as another additional housing is thus not required.

A development of the application provides that the function of the converter device is unaffected by the antenna device by suitably positioning the antenna device in the housing of the converter device. This occurs because, for example, a main emission direction, i.e. an emission maximum, of the antenna device is not directed toward components of the converter device, i.e. is directed away from or past said components. This has the advantage of the antenna device providing additional functionality in the converter device without degrading the functionality of the converter device. The antenna device is also positioned in a manner such that a main emission direction is aligned in a particular plane of the housing. This means that, for example, when the housing of the converter device is brought into a certain position, the main emission direction of the antenna device lies in the horizontal plane. The advantage of this is that the transmission power is concentrated in this plane for a Bluetooth and/or wireless connection. Thus, for example, reception is made possible by means of a mobile terminal. An antenna characteristic in this plane is preferably omni-directional, which means that the electromagnetic emission is of equal magnitude in all directions in this plane. The antenna characteristic may also be lobe-shaped and thus preferably emit in one direction or may be double lobe-shaped and may in particular have a main emission direction in two mutually opposing directions of the plane and may emit in each of these more strongly than in two other directions in the plane that are perpendicular to the first two directions.

A development of the application provides that the housing of the converter device has at least one electrical ground terminal. Both the components of the converter device and the components of the antenna device are earthed by this ground terminal. This means that the ground point of the antenna device is the same ground point of the converter device. The advantage of this is that the antenna device, which is integrated in the housing of the converter device, does not require a separate ground terminal and saves installation space. Instead, an existing ground point of the converter device can also be used by the antenna device. In this case, this ground point is preferably an electrically conductive connection element which is designed to fix the housing mechanically at a predetermined location in the motor vehicle, for example a screw clip.

The application also provides a motor vehicle comprising a built-in converter device according to the application. The converter device is configured to provide impedance matching of a vehicle and/or broadcast antenna of the motor vehicle and/or to amplify the signal. An antenna device, which is an antenna device of the above-described converter device, is integrated in the housing of the converter device. This integration saves installation space in the motor vehicle, which would otherwise be occupied by at least one additional housing of a Bluetooth and/or WLAN module.

In a development of the motor vehicle according to the application, an installation position is selected such that a main emission direction, i.e. a maximum emission of the antenna device, is directed in a horizontal plane of the motor vehicle. This means that the main emission direction of the antenna device is not directed toward the vehicle roof and/or vehicle floor, but in a horizontal plane. Preferably, this plane is between the level of the driver's seat and the vehicle roof. At least the horizontal component of a vector of the main emission direction is greater than the vertical component. In particular, however, signals can also be emitted into regions above the vehicle roof in auxiliary emission directions. An omnidirectional and/or figure-of-eight emission characteristic of the antenna device ensures that a Bluetooth and/or WLAN connection is entirely possible using devices located inside and/or outside the motor vehicle. This means that the majority of the emitted energy is directed into a region in which there are Bluetooth and/or WLAN-capable devices, for example in the vehicle interior and/or in an exterior space around a vehicle in which a user is standing beside the motor vehicle when using a device of this kind. The advantage of integrating the antenna device in the housing of the converter device is that this housing is mounted by default in positions that allow very good signal emission in said interior space and/or exterior space around the vehicle.

A development of the motor vehicle according to the application provides that a WLAN hotspot is provided and/or image transmission signals are transmitted by means of the antenna device in a region in and/or around the motor vehicle. A control device of the motor vehicle is configured to set such an operating mode. A WLAN hotspot provides a user of the motor vehicle with the advantage of being able to connect, for example, a plurality of WLAN-capable devices to the Internet over a single Internet connection provided by the motor vehicle. Image transmission can be advantageously used to transmit camera images over WLAN during a process of assisted parking, such that said images are displayed on a display of the motor vehicle and/or are accessible to a central server device.

The application also includes developments of the motor vehicle according to the application which have features such as those previously described in connection with the developments of the converter device according to the application. For this reason, the corresponding further embodiments of the motor vehicle according to the application are not described again here.

Figure 1:
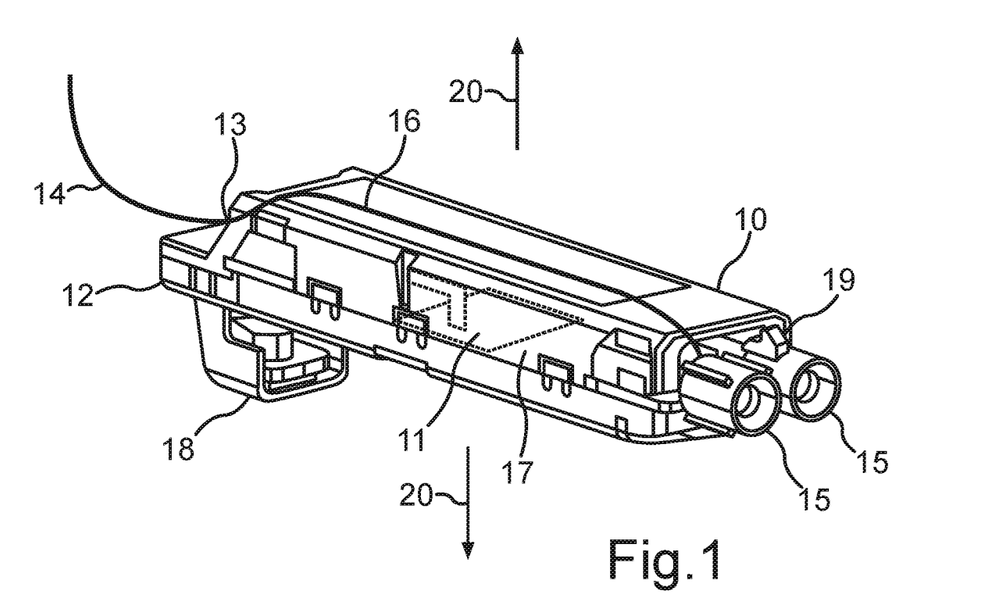
FIG. 1 is a schematic view of a converter device comprising an integrated antenna device.
Figure 2:
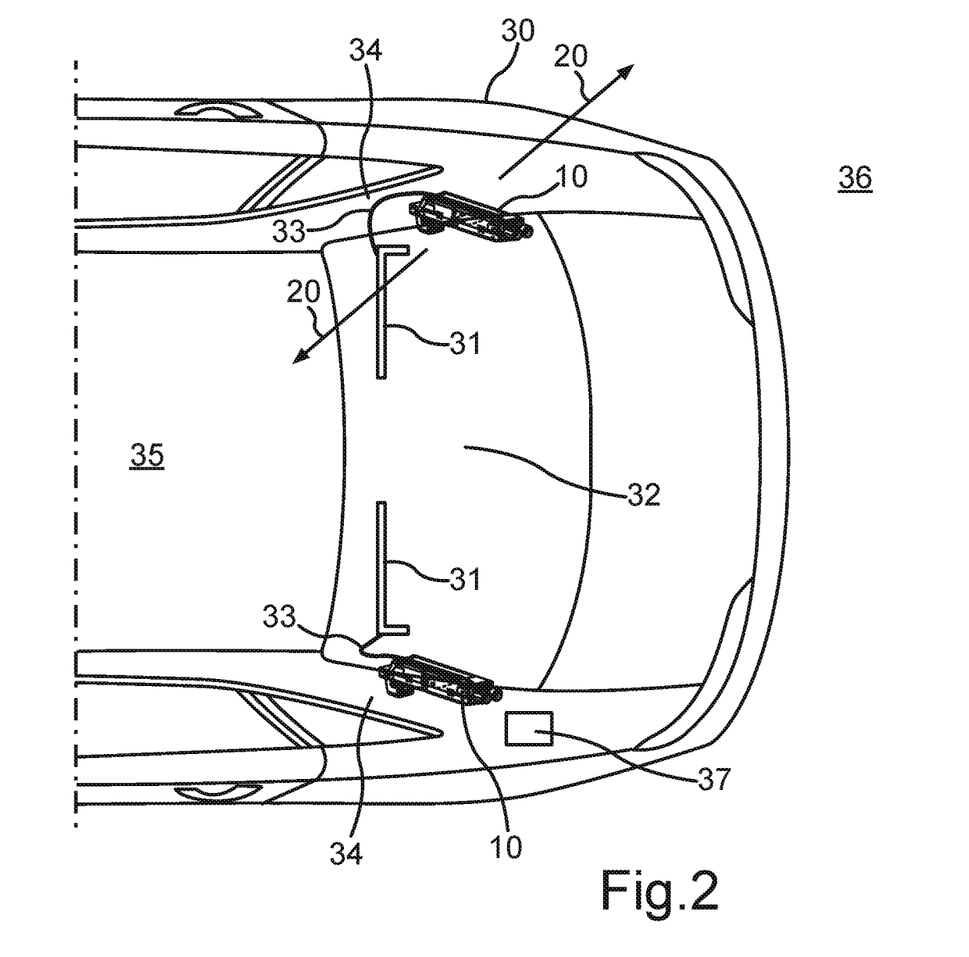
FIG. 2 is a schematic view of a motor vehicle comprising two built-in converter devices.
Figure 3:
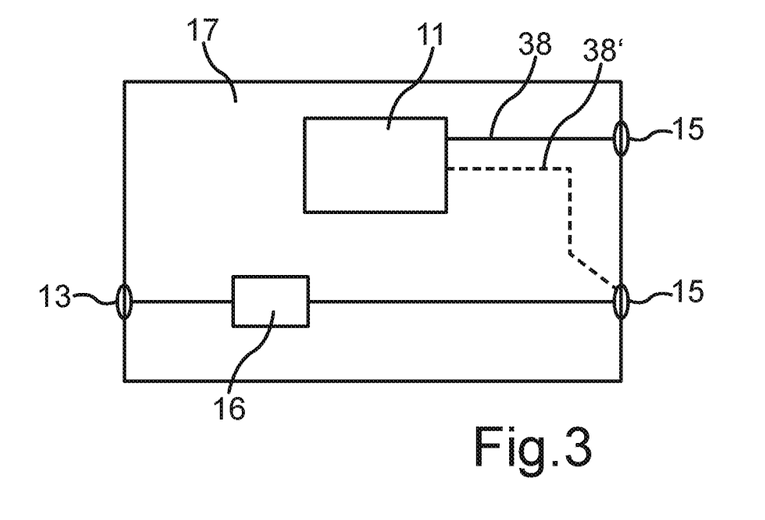
FIG. 3 is a schematic view of an electrical circuit board comprising an integrated antenna device.

Exemplary embodiments of the invention are described below. In the drawings:

FIG. 1 is a schematic view of a converter device comprising an integrated antenna device;

FIG. 2 is a schematic view of a motor vehicle comprising two built-in converter devices; and FIG. 3 is a schematic view of an electrical circuit board comprising an integrated antenna device.

The embodiments explained below are preferred embodiments of the invention. In the embodiments, the described components of the embodiments each constitute individual features of the application to be considered independently of one another, each of which independently further develops the application, and are therefore also to be considered as part of the application individually or in a combination different from that shown. In addition, features of the application other than those already described can be added to the embodiments described.

In the drawings, elements having the same function are each provided with the same reference signs.

FIG. 1 shows a converter device 10 comprising an integrated antenna device 11. The antenna device 11 is installed in a housing 12 of the converter device 10. A broadcast antenna 14 is connected to the converter device 10 by an electrical input 13 of the converter device 10, and outputs 15 of the converter device 10 are designed as coaxial plug-in connections. The electrical input 13 and at least one electrical output 15 are interconnected by a conversion path 16. The conversion path 16 includes electrical components (not shown here) that bring about impedance conversion and/or amplification. These are known per se from the prior art. An electrical circuit board 17 is integrated in the housing 12. A ground terminal 18 also provides a mechanical connection element in addition to a ground connection. The electrical outputs 15 have a snap-in element 19 for a snap-fit connection. An emission characteristic of the antenna device 11 has two main emission directions 20, each of which is an emission maximum of the antenna characteristic, which is directed perpendicularly to the antenna device 11 in different directions in each case.

FIG. 2 shows a motor vehicle 30, in which two converter devices 10 are installed. An antenna structure 31 is attached to a vehicle rear window 32 and is electrically connected to each converter device 10 by an electrical connection 33. The converter devices 10 are each mounted in a C-pillar 34 of the motor vehicle 30 and are positioned such that each main emission direction 20 of the converter device 10 is directed into an interior space 35 of the motor vehicle 30 and into an exterior space 36 around the motor vehicle 30. The converter devices can also be attached to the A-pillar, the C-pillar or in the luggage-compartment lid of the motor vehicle. The motor vehicle 30 also has a control unit 37, by means of which at least the Bluetooth and/or WLAN connection is controlled. In the embodiment of the converter device with the integrated antenna device and transceiver, the Bluetooth and/or WLAN connection is controlled via the transceiver itself.

FIG. 3 shows the electrical circuit board 17 with an electrical input 13 and two electrical outputs 15. The conversion path 16 connects the input 13 and an output 15 and amplifies the signal therebetween and/or adjusts an impedance therebetween. An antenna device 11 is designed as a patch antenna for receiving a WLAN signal and is connected to a second electrical output 15 by an electrical connection 38. In another embodiment, the antenna device 11 may also be connected to the same electrical output 15 as the conversion path 16 by an electrical connection 38'.

In one embodiment, it is provided that the converter device 10 adapts an impedance of a broadcast antenna 14 such that a predetermined impedance is 50 ohms at an electrical output 15. In the embodiment, a signal from the broadcast antenna 14 and a signal from the antenna device 11 are conveyed through a single output 15. A coaxial cable which is mechanically secured by the snap-in element 19 via a securing element is connected to this output 15 such that it cannot be detached from the output 15 without actuating the snap-in element 19. When the converter device 10 is thus installed in a motor vehicle 30, the coaxial cable cannot be detached due to the snap-in element 19 even when subject to vibrations caused when driving the motor vehicle 30.

In one embodiment, an antenna of the electrical antenna device 11 integrated in the housing 12 is designed as a planar patch antenna, which is mounted on the electrical circuit board 17 of the converter device 10. This patch antenna is connected to a first output 15 by an electrical connection. The conversion path 16 is, however, connected to a second or other output 15. The converter device thus provides this embodiment with separate outputs 15 for the external broadcast antenna 14 and the antenna device 11, respectively. In this embodiment, two coaxial cables are connected in a coaxial connection element, which can be jointly connected to the two outputs 15. Here, the joint plug-in element has a mating part to the snap-in element 19, such that both coaxial cables are mechanically secured by a single snap-in element 19. In another embodiment, an electrical antenna device 11 for a Bluetooth connection is connected to a first terminal 15, an antenna device 11 for a WLAN connection is connected to a second terminal 15, and other broadcasting services of the external antenna are connected to further terminals 15.

In one embodiment, the converter device 10 is installed in a motor vehicle 30. Here, the integrated antenna device 11 provides a Bluetooth and WLAN connection, which are important in motor vehicles for an increasing number of new services. As more and more motor vehicles use increasing numbers of Bluetooth or WLAN services, it is necessary to cover an exterior space 36 around the motor vehicle and an interior space 35 of a vehicle with sufficient Bluetooth and WLAN signal levels. This is provided by the antenna device 11. The converter device 10 is positioned in a C-pillar 34 of the motor vehicle in this case. Two converter devices or several converter devices can also be installed in the motor vehicle. In this case, each converter device is connected at least to a vehicle antenna 31. In this embodiment, the vehicle antenna 31 is integrated in a rear window 32 of the motor vehicle. The vehicle antenna is designed here as a broadcast antenna 14. This is suitable for the reception of radio signals such as AM and/or FM signals, as well as DAB signals. In another embodiment, the vehicle antenna 31 is suitable for receiving television signals. The vehicle antenna 31 is connected to the converter devices 10 by an electrical connection 33, the electrical connection 33 being connected to the electrical inputs 13 of the respective converter devices 10. Here, the electrical connection 33 is what is known as a pig tail, which refers to a electrical connection established by a short cable. In another embodiment, converter devices 10 may likewise be incorporated into other vehicle pillars of the motor vehicle 30, for example in an A-pillar or B-pillar. Likewise, converter devices 10 may be installed in a luggage-compartment lid of the motor vehicle 30. Here, a converter device 10 is tightly screwed to a body of the motor vehicle 30, the screw connection being established on the ground terminal 18, such that the vehicle body also forms an electrical ground for the converter device 10 and the antenna device 11.

In another embodiment, a converter device 10 is positioned in a C-pillar 34 of the motor vehicle 30 such that two of its main emission directions 20 point in opposite directions. A main emission direction 20 points directly into the interior space 35 of the motor vehicle 30 in this case. The other main emission direction 20 points into the exterior space 36 around the motor vehicle 30. In this embodiment, the exterior space 36 is an exterior space in the horizontal direction of the motor vehicle, in which a user with a Bluetooth and/or WLAN-capable device is located when they are standing beside the motor vehicle 30. In this embodiment, the motor vehicle 30 provides a WLAN hotspot by means of the antenna device 11 which a user can use in the interior space 35 or the exterior space 36 around the motor vehicle 30.

Overall, the examples show how the application can integrate a Bluetooth and/or WLAN antenna with associated components of a radio module such as a preamplifier and/or transceiver in the housing of a converter device for broadcast services such as AM/FM/TV/DAB and install the above in a motor vehicle. The integrated Bluetooth/WLAN antenna provides various services in the motor vehicle, for example a Bluetooth connection, a WLAN hotspot in the motor vehicle for an RF stream, or image transmission over WLAN during assisted parking. The integration thus extends the original function of the converter device to include the functionality of Bluetooth/WLAN. For this purpose, an antenna structure with a diagnostic resistor is integrated on a printed circuit board of the converter device. By means of an RF line on the printed circuit board, the antenna signal from the integrated antenna is routed from the antenna structure to a coaxial connection provided for this purpose. From the coaxial connector, the high-frequency signal is forwarded by a coaxial line to a control unit of the motor vehicle. A coaxial connector may be a specific connector certified for motor vehicles. The advantage of integrating a Bluetooth/WLAN function in a converter device is that the standard installation position of the converter device in motor vehicles is at those positions which are ideally suited to emitting a Bluetooth/WLAN signal to an interior space and an exterior space around the motor vehicle by means of the antenna device. Integrating the antenna device in the converter device also ensures interoperability with other radio services and/or electromagnetic compatibility (EMC). Above all, prior to a construction step, it is not necessary to search any further for installation locations for Bluetooth/WLAN antennas in the motor vehicle, and separate holders can be omitted, thus avoiding separate costs of such separately installed Bluetooth/WLAN antennas. By integrating the Bluetooth/WLAN functionality in the converter device, it is also not necessary to install two separate components in the motor vehicle, the assembly costs are reduced to the installation, and the wiring of a single component. This has particular advantages in series tool production of the supporting component, i.e. the housing. In particular, there is not always additional installation space available in motor vehicles, since many motor vehicles already have a very high packing density. By integrating the Bluetooth/WLAN functionality, a separate Bluetooth or WLAN antenna can in particular be replaced with a more advantageous antenna structure on the circuit board of the converter device. Installing a single component having two different functions eliminates the need to install an additional component, which reduces manufacturing time. Standardized Bluetooth/WLAN concepts for motor vehicles can be implemented by integrating the antenna device in the converter device, whereby line variance in various motor vehicle models can be minimized. In one embodiment, the converter device is a standard housing for installation in motor vehicles, which provides active signal routing between the electrical input and the electrical converter output, i.e. also carries out signal amplification in addition to impedance conversion. For example, an AM signal can only be impedance-matched and another signal can be simultaneously impedance-matched and amplified. A signal can also only be amplified.

Overall, the example shows how the application can provide an integration principle for Bluetooth/WLAN antennas in a converter device for AM/FM/TV/DAB broadcasting services.

The invention claimed is:

1. A converter device comprising a housing configured to be installed in a motor vehicle, wherein the housing comprises:
   a conversion path, the conversion path including an impedance converter;
   an electrical input;
   an electrical output;
   an antenna device comprising:
      an active electronic component configured to provide a Bluetooth connection to a Bluetooth-capable device or configured to provide a WLAN connection to a WLAN-capable device;
      an antenna device terminal configured to electrically connect to the antenna device as an antenna device electrical output or an antenna device electrical input; and
   a common plug connection element;
   wherein the conversion path connects the electrical input and the electrical output;
   wherein the impedance converter is configured to convert an impedance of an external broadcast antenna which is positioned outside the housing and connected to the electrical input to a predetermined impedance of an electrical device that can be connected to the electrical output, such that the predetermined impedance is provided at the electrical output;
wherein the electrical output and the antenna device terminal are configured in the common plug connection element which has an electrically conductive pin for connecting an electrical cable and both the conversion path and the antenna device.

2. The converter device according to claim 1, wherein the electrical output and the antenna device terminal are designed as a common coaxial connection element, the common coaxial connection element including a mechanical securing element for securing the common coaxial connection element.

3. The converter device according to claim 1, wherein the antenna device further comprises an electrically conductive structure antenna, wherein the electrically conductive structure antenna is a planar structure mounted on a carrier substrate of the converter device.

4. The converter device according to claim 1, wherein the antenna device further comprises a preamplifier or transceiver, the preamplifier or transceiver being integrated in the housing and connected to the antenna device terminal.

5. The converter device according to claim 1, wherein the antenna device is positioned in the housing of the converter device such that the conversion path is electrically unaffected by the antenna device, and wherein an electromagnetic emission of the antenna device in a first plane of the housing is greater than in a second plane, and wherein an electromagnetic emission characteristic in the first plane is omnidirectional or lobe-shaped or double lobe-shaped.

6. The converter device according to claim 1, wherein the conversion path has a ground connection which can be connected to a vehicle body of the motor vehicle, and the ground connection of the conversion path also forms the ground connection of the antenna device.

7. A motor vehicle comprising a converter device for impedance matching of an external broadcast antenna, wherein the converter device comprises a housing comprising:
a conversion path including an impedance converter;
an electrical input;
an electrical output;
an antenna device comprising:
an additional active electronic component configured to provide a Bluetooth connection to a Bluetooth-capable device or configured to provide a WLAN connection to a WLAN-capable device;
an antenna device terminal configured to electrically connect to the antenna device as an antenna device electrical output or an antenna device electrical input; and
a common plug connection element;
wherein the conversion path connects the electrical input and the electrical output,
wherein the impedance converter is configured to convert an impedance of the external broadcast antenna which is positioned outside the housing and connected to the electrical input to a predetermined impedance of an electrical device that can be connected to the electrical output, such that the predetermined impedance is provided at the electrical output;
wherein the electrical output and the antenna device terminal are configured in the common plug connection element which has an electrically conductive pin for connecting an electrical cable and both the conversion path and the antenna device.

8. The motor vehicle according to claim 7, wherein an installation position of the converter device is selected such that a maximum emission of the antenna device is directed into an interior space of the motor vehicle or into an external horizontal surrounding area of the motor vehicle.

9. The motor vehicle according to claim 7, wherein the antenna device is configured to provide a WLAN hotspot in a relevant operating mode by means of a control unit and/or configured to transmit image signals.

* * * * *